(12) United States Patent
Adelmann et al.

(10) Patent No.: US 11,599,138 B2
(45) Date of Patent: Mar. 7, 2023

(54) SYSTEM AND METHOD FOR APPLYING A MAGNONIC MATRIX-VECTOR-MULTIPLIER ARRANGEMENT

(71) Applicants: IMEC vzw, Leuven (BE); Katholieke Universiteit Leuven, Leuven (BE)

(72) Inventors: Hanns Christoph Adelmann, Wilsele (BE); Jose Diogo Costa, Heverlee (BE); Florin Ciubotaru, Heverlee (BE)

(73) Assignees: IMEC VZW, Leuven (BE); KATHOLIEKE UNIVERSITEIT LEUVEN, Leuven (BE)

( * ) Notice: Subject to any disclaimer, the term of this patent is extended or adjusted under 35 U.S.C. 154(b) by 596 days.

(21) Appl. No.: 16/593,917

(22) Filed: Oct. 4, 2019

(65) Prior Publication Data

US 2020/0110433 A1 Apr. 9, 2020

(30) Foreign Application Priority Data

Oct. 5, 2018 (EP) .................................... 18198863

(51) Int. Cl.
*G06N 3/08* (2006.01)
*G06E 1/04* (2006.01)
*G06N 3/084* (2023.01)

(52) U.S. Cl.
CPC ............. *G06E 1/045* (2013.01); *G06N 3/084* (2013.01)

(58) Field of Classification Search
CPC ........ G06E 1/045; G06N 3/084; B82Y 20/00; H01L 41/00
See application file for complete search history.

(56) References Cited

U.S. PATENT DOCUMENTS

2007/0296516 A1* 12/2007 Eshaghian-Wilner ...................... G11C 11/14
333/101
2010/0075599 A1 3/2010 Xi et al.
(Continued)

FOREIGN PATENT DOCUMENTS

WO WO 2014/207818 12/2014
WO WO 2018/182694 10/2018

OTHER PUBLICATIONS

Stephan Breitkreutz-von Gamm, et al. "Design of On-Chip Readout Circuitry for Spin-Wave Devices", IEEE Magnetics Letters, vol. 8, 2017, pp. 1-4.
(Continued)

*Primary Examiner* — Jamal Javaid
(74) *Attorney, Agent, or Firm* — Knobbe, Martens, Olson & Bear LLP

(57) ABSTRACT

An arrangement for use in a matrix-vector-multiplier, comprising a stack of material layers arranged on a substrate, and a waveguide element formed in at least one material layer in the stack is disclosed. In one aspect, the arrangement further comprises a transducer arrangement which is coupled to the waveguide element. The transducer arrangement is configured to generate and detect spin wave(s) in the waveguide element, and wherein the waveguide element is configured to confine and to provide interference of the at spin wave(s) propagating therein. The arrangement further comprises a control mechanism comprising at least one control element coupled to the waveguide element, and a direct current electric source coupled to the at least one control element. The control mechanism, via the at least one control element, is configured to modify the phase velocity of the spin wave(s) propagating in the waveguide element.

15 Claims, 4 Drawing Sheets

(56) References Cited

U.S. PATENT DOCUMENTS

2016/0162781 A1    6/2016    Lillicrap et al.
2017/0248640 A1    8/2017    Csaba et al.
2018/0115294 A1*   4/2018    Gong .................. H01F 21/08

OTHER PUBLICATIONS

Mary M Eshaghian-Wilner, et al. "Emulation of Neural Networks on a Nanoscale Architecture", Journal of Physics: Conference Series, vol. 61, pp. 288-292.
György Csaba, et al. "Perspectives of using spin waves for computing and signal processing", Physics Letters A, vol. 381, Mar. 2, 2017, pp. 1471-1476.
György Csaba, et al. "Non-Boolean Computing Based on Linear Waves and Oscillators", 2015 45th European Solid State Device Research Conference (EDDDERC), IEEE, Graz, 2015, pp. 101-104.
György Csaba, et al. "Spin-wave based realization of optical computing primitives", Journal of Applied Physics, vol. 115 (17), 2014, p. 17C741.
Lin Yang et al. "On-chip optical matrix-vector multiplier for parallel computation", SPIE Newsroom, Jun. 21, 2013.
Michiel Hermans et al. "Towards Trainable Media: Using Waves for Neural Network-Style Learning", Oct. 14, 2015.
M. Prezioso et al. "Training and operation of an integrated neuromorphic network based on metal-oxide memristors", Nature, vol. 521, No. 7550, May 1, 2015, pp. 61-64.
Ádám Papp, et al. "Optically-Inspired Computing Based on Spin Waves", 2016 IEEE International Conference on Rebooting Computing (ICRC), IEEE, San Diego, CA, 2016, pp. 1-4.
Extended European Search Report dated Mar. 21, 2019 EP Application No. 18198863.5.

\* cited by examiner

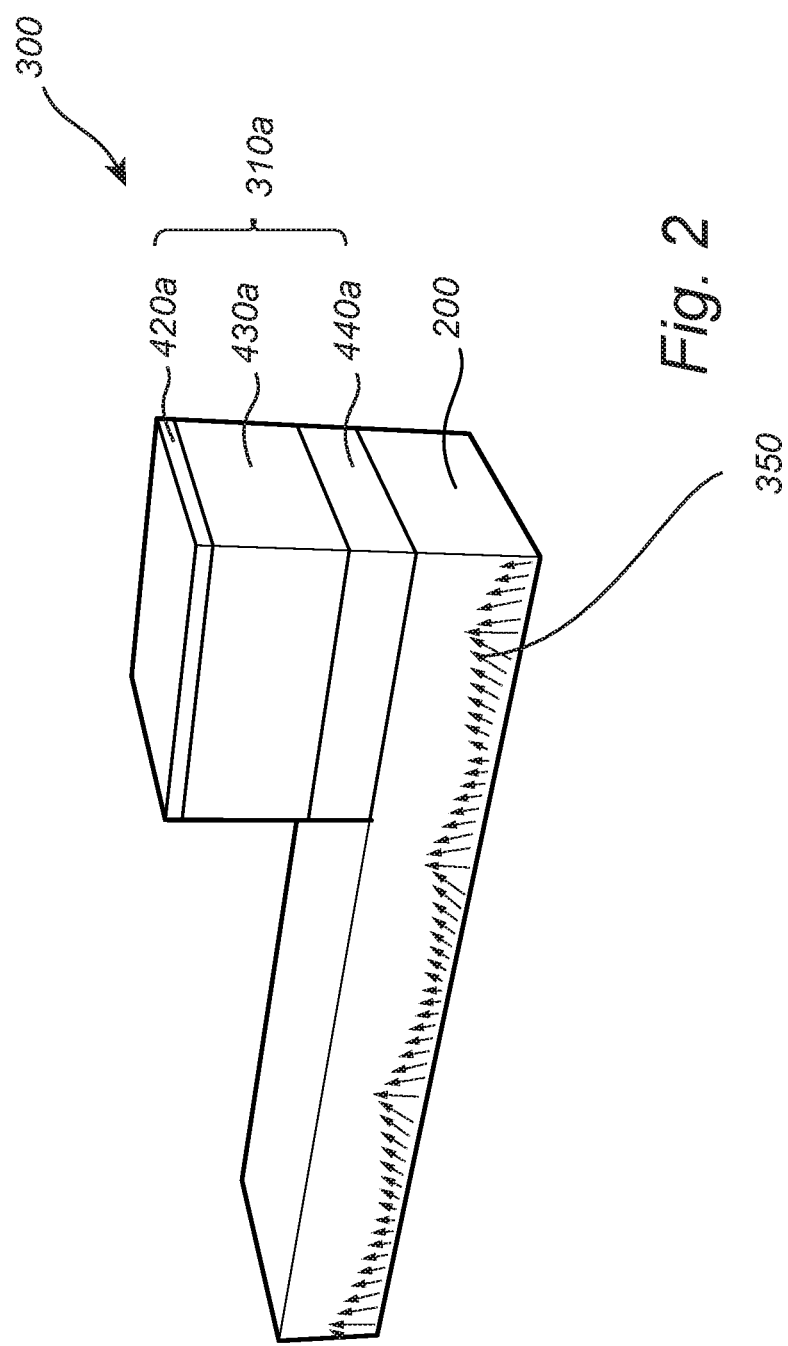

SYSTEM AND METHOD FOR APPLYING A MAGNONIC MATRIX-VECTOR-MULTIPLIER ARRANGEMENT

CROSS-REFERENCE TO RELATED APPLICATIONS

This application claims foreign priority to EP 18198863.5, filed Oct. 5, 2018 and titled "ARRANGEMENT FOR USE IN A MAGNONIC MATRIX-VECTOR-MULTIPLIER", the content of which is incorporated by reference herein in its entirety.

STATEMENT REGARDING SPONSORED R&D

This application resulted from a project that received funding from the European Union's Horizon 2020 research and innovation program under the Marie Sklodowska-Curie grant agreement no. 793346.

BACKGROUND

Field

The disclosed technology generally relates to the field of matrix-vector-multipliers (MVMs). More specifically, the disclosed technology relates to an arrangement for use in a MVM and methods for training and using a MVM.

Description of the Related Technology

Information and communication technology (ICT) has experienced immense advancements during the recent decades thanks to miniaturization in semiconductor electronics and progress in optical (photonic) technologies. However, further downscaling, following Moore's law, inevitably leads to other challenges. More specifically, it is widely acknowledged in the semiconductor community that the miniaturisation of conventional transistors, such as complementary metal oxide semiconductor (CMOS) transistors, is challenging and for many applications there is a need for alternative device structures. Notably, linear transformations (multiplication of a matrix) of an input vector are costly to realize in CMOS, and there is an increasing effort in finding alternative implementations based on physical principles.

Matrix-vector-multipliers (MVMs) are electronic devices (hardware) that can be used to perform linear transformations. MVMs can be used as calculation units to perform such linear transformations but they are also a key element in neural networks (NN) that are used for machine learning. As described in numerous sources and also being known by the skilled person, a neural network is an interconnected group of artificial neurons that uses a mathematical or computational model for information processing based on a connectionistic approach to computation. In most cases, the neural network is an adaptive system that changes its structure based on external or internal information that flows through the network. The most common neural network model is the 3-layer backpropagation model, comprising three layers of nodes. The three layers are an input layer, an output layer, and a "hidden" layer in the middle. The nodes are linked by connections which have a weight. Signal values propagate from the inputs, through the weighted connections to the hidden nodes, and then onwards through more weighted connection to the output nodes. In the context of learning, backpropagation is used to adjust the weights. This is also sometimes called backward propagation of errors, because the error is calculated at the output and distributed back through the neural network layers. Hence, the weights of the connections are trained by multiplying a 'forward' signal with a backwards propagating 'error' signal.

The article "Towards Trainable Media: Using Waves for Neural Network-style Learning" (M. Hermans & T. Vaerenberghy, arXiv:1510.03776 (2015), https://arxiv.org/abs/1510.03776) describes the concept of using the interaction between waves and a trainable medium in order to construct a MVM. In particular, a device in the context of the backpropagation algorithm is studied. The article describes realizations by light waves and acoustic waves. For optical waves, the article mentions coherent light sources (lasers) as wave generators, photodetectors as detectors, and electrooptic cells to train the waveguiding medium. The training/tuning of the medium for wave propagation is done by local modification of the refractive index (the phase velocity) of the medium (e.g. by the electro-optic effect). This modifies the interference pattern of the input waves and performs the computation in the system.

However, it should be noted that devices of the above-mentioned kind suffer from drawbacks. Firstly, as the electrooptic effects are relatively small, the trainability of the neural network is limited even for relatively large voltages applied. Secondly, the devices are not bidirectional, which limits the convenient implementation of common backpropagation algorithms for neural network learning. Hence, there is a need to provide an MVM device or system which may provide the advantages of being bidirectional, thereby improving the usage in artificial neural networks as it allows for a convenient and efficient implementation of backpropagation algorithms for training purposes.

SUMMARY OF CERTAIN INVENTIVE ASPECTS

It is an object of the disclosed technology to improve the above techniques and the prior art. In particular, it is an object to provide an arrangement for use in an MVM device or system which may provide the advantages of being bidirectional. Further, methods for training and using such MVM devices or systems are also provided.

This and other objects are achieved by providing an arrangement for use in an MVM and methods for training and using such MVM generating spin waves having the features in the independent claims. Preferred embodiments are defined in the dependent claims.

Hence, according to a first aspect of the disclosed technology, there is provided an arrangement for use in an MVM. The arrangement comprises a stack of material layers arranged on a substrate, and a waveguide element formed in at least one material layer in the stack. The arrangement further comprises a transducer arrangement which is coupled to the waveguide element. The transducer arrangement is configured to generate and detect at least one spin wave in the waveguide element, and wherein the waveguide element is configured to confine and to provide interference of the at least one spin wave propagating therein. The arrangement further comprises a control mechanism formed in at least one material layer in the stack, wherein the control mechanism comprises at least one control element coupled to the waveguide element, and a direct current electric source coupled to the at least one control element. The control mechanism, via the at least one control element, is configured to modify the phase velocity of the at least one spin wave propagating in the waveguide element.

According to a second aspect of the disclosed technology, there is provided a method for training an MVM arrangement. The method comprises the step of providing the MVM arrangement according to the first aspect of the disclosed technology. The method further comprises the step of, via the transducer arrangement of the MVM arrangement, generating and providing interference of at least one spin wave in the waveguide element. The method further comprises the step of applying, via the direct current electric source and the at least one control element of the control mechanism, a direct current, DC, signal for controlling the respective weight of the at least one connection by modifying the phase velocity of the at least one spin wave propagating in the waveguide element.

According to a third aspect of the disclosed technology, there is provided a method for using an MVM arrangement. The method comprises providing an MVM arrangement, comprising the arrangement according to the first aspect of the disclosed technology, at least one input layer and at least one output layer. The method further comprises the step of performing the method for training the MVM arrangement according to the second aspect of the disclosed technology. The method further comprises the step of providing at least one input signal into the MVM arrangement via the at least one input layer, and receiving at least one output signal from MVM arrangement via the at least one output layer.

Thus, the disclosed technology is based on the idea of providing an arrangement for use in an MVM. The arrangement has a stacked layer structure. A transducer arrangement is coupled to a waveguide element in the stack and is configured to generate and detect at least one spin wave in the waveguide element. The waveguide element is configured to confine and to provide interference of the spin wave(s) propagating therein. The arrangement further comprises a control mechanism which comprises at least one control element coupled to the waveguide element, and a direct current electric source coupled to the control element(s). Via the control element(s), the control mechanism is configured to modify the phase velocity of the spin wave(s) propagating in the waveguide element.

The arrangement of the disclosed technology is highly advantageous, in that spin waves are used instead of optical waves. Notably, the magnetoelectric effect provides a much larger tuning range compared to the electrooptic effects. For example, it can be anticipated that the phase velocity of the spin waves can be modified by a factor of two by applying electric fields in the order of 100 kV/cm. Moreover, the transducers may act as both spin wave generators and spin wave detectors, leading to a full bidirectionality if provided in an MVM, whereas different components may be integrated in an optical implementation. The arrangement hereby provides a convenient and efficient implementation of the ability to provide backpropagation algorithms for training purposes of an MVM and/or an artificial NN comprising the arrangement.

An arrangement for use in an MVM is provided. The arrangement of the disclosed technology comprises a stack of material layers arranged on a (single) substrate. By the term "stack of material layers", it is hereby meant that material layers are arranged or stacked on top of each other. A waveguide element is formed in at least one material layer in the stack. Hence, the arrangement comprises a waveguide element in which at least one spin wave is configured to propagate, wherein the waveguide element further is configured to provide interference of the spin waves propagating therein.

The arrangement further comprises a transducer arrangement coupled to the waveguide element, wherein the transducer arrangement is configured to generate and detect at least one spin wave propagating in the waveguide element. By the term "transducer arrangement", it is meant a transducer device or arrangement for converting energy from one form to another, e.g., electrical energy to magnetic excitations energy (spin waves).

The arrangement further comprises a control mechanism formed in at least one material layer of the stack. The control mechanism comprises at least one control element coupled to the waveguide element, and a direct current electric source coupled to the at least one control element. Via the at least one control element, the control mechanism is configured to modify the phase velocity of the at least one spin wave propagating in the waveguide element. By the term "phase velocity", it is here meant the phase velocity of a wave as commonly known to the skilled person. Hence, for the present case of spin waves, the phase velocity of the spin wave(s) is the rate at which the phase(s) of the spin wave(s) propagate(s).

The disclosed technology is advantageous in that the control mechanism, via the DC signal applied by the DC electric source to the control element(s) of the control mechanism, may conveniently and efficiently modify the phase velocity (velocities) locally of the spin wave(s) propagating in the waveguide element. Hence, the control mechanism is able to provide a local magnetic field that locally changes the spin wave phase velocity in a convenient and efficient way. It should be noted that devices according to the prior art, e.g. comprising coherent light sources (lasers) as wave generators, photodetectors as detectors, and/or electrooptic cells to train the waveguiding medium, suffer from drawbacks. Firstly, as the electrooptic effects are relatively small, the trainability of an MVM and/or NN is limited even for relatively large voltages applied. Secondly, these devices are not bidirectional, which limits the convenient implementation of common backpropagation algorithms for MVM and/or NN learning. In contrast, by the innovative concept of the disclosed technology, a convenient and efficient implementation of backpropagation algorithms for training purposes of an MVM and/or NN is provided by controlling the phase velocity of the spin wave(s) propagating in the waveguide element of the arrangement.

The disclosed technology is further advantageous in that the configuration of the arrangement as a stack of material layers arranged on a substrate constitutes a relatively compact arrangement. The arrangement of the disclosed technology may be monolithic and/or the elements/components of the arrangement may be monolithically integrated. It will be appreciated that the arrangement may encompass hybrid integration, e.g. using chip bonding. For example, the arrangement may comprise a two-chip arrangement, wherein one chip may comprise the waveguide element and the other chip may comprise the control mechanism. Hence, in principle, the disclosed technology may provide a relatively small, space and cost-saving arrangement. This feature of the arrangement of the disclosed technology is highly important when considering the parameters for further downscaling of electronic arrangements and/or devices.

It will be appreciated that the arrangement of the disclosed technology furthermore may be manufactured using semiconductor fabrication technologies, more in particular CMOS compatible processing technologies, which are highly beneficial regarding size, processing efficiency and/or cost.

According to an embodiment of the disclosed technology, the waveguide element may comprise a magnetic material. Hence, the waveguide element may comprise or constitute a magnetic material, e.g. ferrimagnetic yttrium iron garnet (YIG) or a ferromagnetic metal like Co, Fe, Ni or its alloys containing one or more of these materials in which spin waves may propagate.

According to an embodiment of the disclosed technology, the at least one control element may comprise at least one antenna. Hence, via the one or more antennas, the control mechanism may modify the phase velocity of the spin wave(s) propagating in the waveguide element. The present embodiment is advantageous in that the antenna(s) are highly suitable for changing the spin wave phase velocity locally of the spin waves propagating in the waveguide element of the arrangement.

According to an embodiment of the disclosed technology, the at least one control element may comprise at least one magnetoelectric cell. By the term "magnetoelectric cell", it is here meant substantially any cell which comprises e.g. at least one piezoelectric element and/or at least one magnetostrictive element.

According to an embodiment of the disclosed technology, the transducer arrangement may comprise at least one input for generating at least one spin wave in the waveguide element, and at least one output for detecting at least one spin wave propagating in the waveguide element. For example, the input(s) may be arranged at one end of the waveguide element, and the output(s) may be arranged at the other end of the waveguide structure, such that the spin waves as generated propagate in the waveguide element. It should be noted that the input(s) and the output(s) may have the same structure, components and/or layers. Hence, the input(s) and the output(s) may be identical. Alternatively, the input(s) and the output(s) may be the same structure, component or layer, i.e. the input may function both as an input and output, and the output may function both as an input and output. The present embodiment is advantageous in that the arrangement for spin wave generation and detection is versatile in its construction.

According to an embodiment of the disclosed technology, the at least one input may comprise an input electrode, a deformation element coupled to the electrode, and a magnetostrictive element coupled to the deformation element, wherein a change in physical dimensions of the deformation element in response to an electrical actuation via the input electrode results in a mechanical stress in the magnetostrictive element, resulting in a change in magnetization of the magnetostrictive element and resulting in a generation of a spin wave in the waveguide element. Hence, via the input electrode, a change in mechanical stress arises in the magnetostrictive element due to the change in physical dimensions of the deformation element. In its turn, this leads to a change in magnetisation in the magnetostrictive element, and consequently leads to a generation of at least one spin wave in the waveguide element.

According to an embodiment of the disclosed technology, the at least one output may comprise an output electrode, a deformation element coupled to the electrode, and a magnetostrictive element coupled to the deformation element, wherein a propagating spin wave results in a change of magnetization of the magnetostrictive element, resulting in a mechanical stress in the magnetostrictive element and results in a change in physical dimensions of the deformation element, resulting in an electrical actuation in the output electrode.

According to an embodiment of the disclosed technology, there is provided a matrix-vector-multiplier, MVM, arrangement. The MVM arrangement comprises the arrangement according to any one of the preceding embodiments. The MVM arrangement further comprises at least one input layer configured to input at least one input signal into the MVM arrangement, and at least one output layer configured to output at least one output signal from the MVM arrangement. The MVM arrangement further comprises at least one intermediate layer arranged between the at least one input layer and the at least one output layer. The at least one intermediate layer is coupled to the at least one input layer and the at least one output layer via at least one connection associated with a weight as a function of the phase velocity of at least one spin wave, W(v), propagating in the waveguide element of the arrangement. The at least one intermediate layer is further coupled to the at least one element. The control mechanism, via the at least one element, is configured to control the respective weight of the at least one connection by modifying the phase velocity of the at least one spin wave propagating in the waveguide element. In other words, the control mechanism may control the weights of the MVM arrangement by controlling the phase velocity (velocities) of the spin wave(s) for training the MVM arrangement.

Hence, the MVM arrangement comprises one or more input layers, a trainable medium (the "hidden layer") in form of the one or more intermediate layers, and the one or more output layers. Nodes (artificial neurons) of the input, intermediate, and output layers are connected by the weighted connections, corresponding to artificial synapses. During computation, nodes in the intermediate layer(s) respond(s) to the signal(s) at the input layer(s) that are connected to them. Subsequently, the output layer(s) respond in a similar fashion to the connected intermediate layer(s). The MVM arrangement can be taught by adjusting response functions of intermediate and output layers to minimise the output error based on known input signals. It should be noted that one of the most computationally intensive parts in a neural network (both in training and operation) are the matrix-vector multiplications (large-scale linear transformations) needed to propagate signals between layers. The present embodiment is advantageous in the bidirectionality of the MVM arrangement (i.e. the ability to perform a multiplication with a transposed matrix in the opposite direction of the MVM arrangement), as well as the trainability of the MVM arrangement (i.e. the ability of the MVM arrangement to adapt itself to a forward signal and an error signal).

According to an embodiment of the disclosed technology, there is provided an artificial neural network (NN), comprising the MVM arrangement according to the previous embodiment.

Further objectives of, features of, and advantages with, the disclosed technology will become apparent when studying the following detailed disclosure, the drawings and the appended claims. Those skilled in the art will realize that different features of the disclosed technology can be combined to create embodiments other than those described in the following.

BRIEF DESCRIPTION OF THE DRAWINGS

This and other aspects of the disclosed technology will now be described in more detail, with reference to the appended drawings showing embodiment(s) of the disclosed technology.

FIG. 2 is a schematic view of a transducer arrangement in an arrangement according to an exemplifying embodiment of the disclosed technology.

DETAILED DESCRIPTION OF CERTAIN ILLUSTRATIVE EMBODIMENTS

Figure 1A:
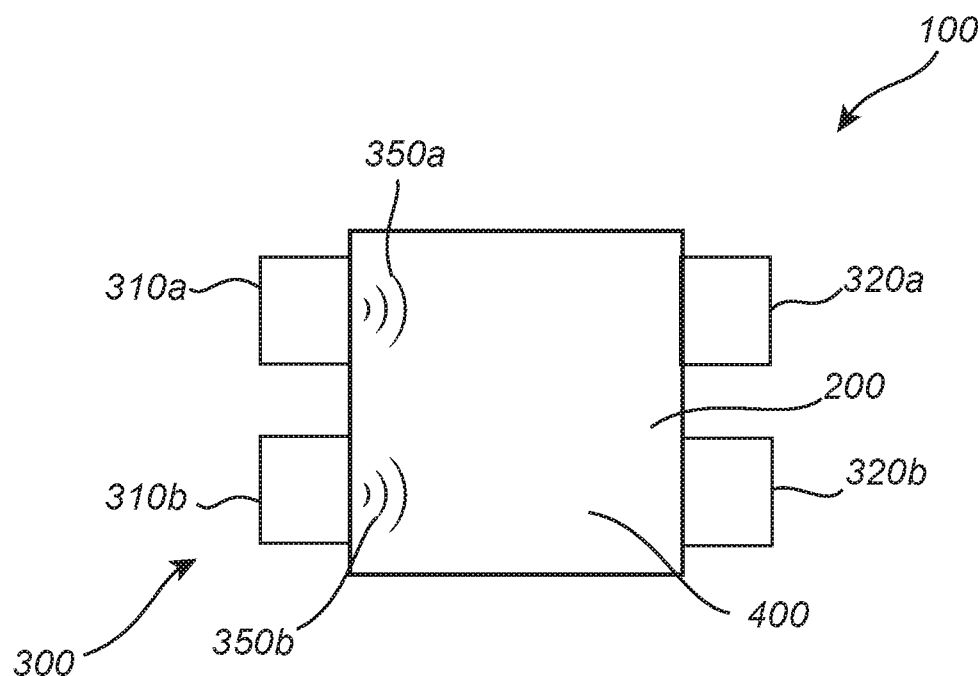
FIG. 1a is a schematic view of an arrangement for use in a matrix-vector-multiplier, MVM, according to an exemplifying embodiment of the disclosed technology.

FIG. 1a is a schematic view of an arrangement 100 for use in a matrix-vector-multiplier, MVM, according to an exemplifying embodiment of the disclosed technology. The arrangement 100 comprises a stack of material layers arranged on a substrate. It will be appreciated that the substrate may be a semiconductor substrate, and the arrangement 100 may hereby be advantageously manufactured using semiconductor fabrication technologies (more in particular, a CMOS compatible processing technology).

A waveguide element 200 is formed in at least one material layer in the stack. The waveguide element 200 may be a film, wire, strip, or the like, which furthermore may comprise a ferromagnetic, ferrimagnetic, antiferromagnetic or ferrite material strip. Hence, embodiments of the disclosed technology are not necessarily limited to ferromagnetic waveguide elements 200, and it will be appreciated that the waveguide element 200 may comprise substantially any material having magnetic properties suitable for the propagation of spin waves, and the associated quasi-particles called magnons. For example, the waveguide element 200 may comprise an antiferromagnetic material. The waveguide element 200 may alternatively comprise a ferromagnetic material, such as ferromagnetic metal based on iron, copper, nickel or alloys thereof, or heterostructures formed from such materials, e.g. NiFe, CoFe, CoNi, CoFeB or CoPt. The waveguide element 200 may also comprise a ferrite material, e.g. oxides based on Fe, Ba, Y, Sr, Zn and/or Co. The waveguide element 200 may furthermore comprise a ferrimagnetic yttrium iron garnet (YIG).

The waveguide element 200 may be adapted for conducting spin waves having microwave frequencies, e.g. in the gigahertz range, e.g. higher than or about equal to 1 GHz, higher than or equal to 10 GHz, higher than or equal 5 to 20 GHz, e.g. higher than or equal to 40 GHz, or even higher, such as e.g. 60 GHz or higher. This is advantageous, in that the arrangement 100 can be implemented on a micro/nanoscale, e.g. having physical dimensions smaller than the wavelength in free space of an electromagnetic wave in the microwave spectrum.

The arrangement 100 further comprises a transducer arrangement 300 which is coupled to the waveguide element 200. In this exemplifying embodiment, the transducer arrangement 300 comprises two inputs 310a, 310b for generating at least one spin wave in the waveguide element 300. The spin waves generated by the two inputs 310a, 310b are schematically indicated by references 350a, 350b. The transducer arrangement 300 further comprises two outputs 320a, 320b for detecting the spin wave(s) 350a, 350b propagating in the waveguide element 200. It will be appreciated that the transducer arrangement 300 may comprise substantially any number of inputs and outputs for generating and detecting spin wave(s) 350a, 350b in the waveguide element 200. It should be noted that the inputs 310a, 310b and the outputs 320a, 320b may have the same structure, components and/or layers. Hence, the inputs 310a, 310b and the outputs 320a, 320b may be identical. Alternatively, the inputs 310a, 310b and the outputs 320a, 320b of the transducer arrangement 300 may be the same structure, component or layer. In other words, the inputs 310a, 310b may function both as an input and output, and the outputs 320a, 320b may function both as an input and an output.

The waveguide element 200 is configured to confine the spin wave(s) 350a, 350b in the waveguide element 200 and to provide interference of the spin wave(s) 350a, 350b propagating therein.

Figure 1B:
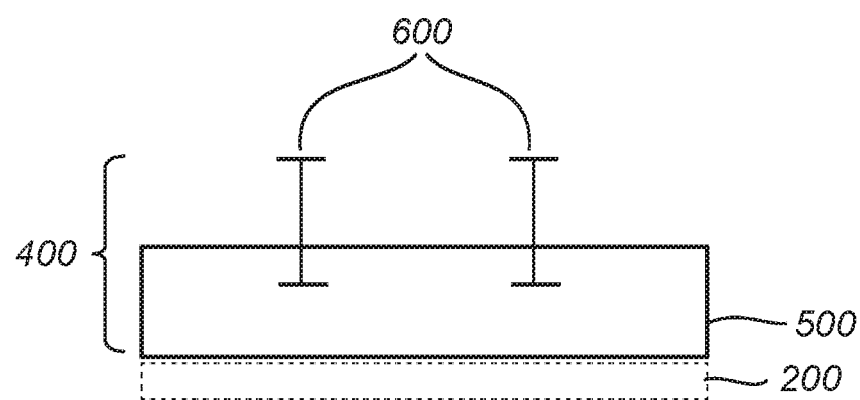
FIG. 1b is a schematic view of a control mechanism in an arrangement according to an exemplifying embodiment of the disclosed technology.

The arrangement 100 further comprises a control mechanism 400 which is formed in at least one material layer in the stack. The control mechanism 400 is schematically indicated in FIGS. 1a and 1b. It should be noted that the control mechanism 400 is preferably arranged on top of the waveguide element 200, but it is also feasible to arrange the control mechanism 400 under the waveguide element 200. In FIG. 1b, the control mechanism 400 comprises a control element 500 which is coupled to the waveguide element 200. It should be noted that the control element 500 is schematically indicated, and may be coupled or connected to the waveguide element 200 in different ways. For example, the control element 500 may be provided in proximity to or in direct physical contact with the waveguide element 200.

The control mechanism 400 further comprises a schematically indicated direct current electric source 600 which is coupled or connected to the control element 500. Via the control element 500 and a direct current (DC) signal from the direct current electric source 600, the control mechanism 400 is configured to modify the phase velocity of the spin wave(s) 350a, 350b propagating in the waveguide element 200.

FIG. 2 is a schematic view of at least a portion of a transducer arrangement 300 in an arrangement according to an exemplifying embodiment of the disclosed technology, e.g. as exemplified in FIG. 1, for input, training, and/or output purposes. Here, the portion of the transducer arrangement 300 comprises an input 310a for generating spin waves. It will be appreciated that the transducer arrangement 300 likewise comprises one or more outputs for detecting spin waves. As the output(s) may have the same or similar construction as the input 310a, it is omitted in FIG. 2.

The input 310a comprises a stack of elements and/or layers. The input 310a comprises, in a top-down direction, an electrode 420a, a deformation element 430a (e.g. a piezoelectric element) configured to change its physical dimensions in response to an electrical actuation, and a magnetostrictive element 440a coupled to the deformation element 430a. The input 310a is arranged on top of the waveguide element 200, the features of which has been described previously. It should be noted that the deformation element 430a alternatively may be provided between (i.e. sandwiched) two electrode layers (not shown). As yet another alternative, the electrode 420a may be provided under the deformation element 430a. For example, the electrode layer 420a may comprise two electrodes, and the deformation element 430*a* may be sandwiched between the two electrodes. The magnetostrictive element 440*a* may comprise Terfenol-D, TbxDy$_1$-xFe2; Galfenol, GaxFe1-x; Co; Ni; a Heusler alloy or a combination thereof, which is advantageous in that well known and easily available materials may be used in the magnetostrictive element 430*a*.

The electrode 420*a*, the deformation element 430*a* and the magnetostrictive element 440*a* may be provided in (close) proximity to or in direct physical contact with the respective neighbouring layer of the input 310*a*. The deformation element 430*a* is advantageously arranged in direct physical contact with the magnetostrictive element 440*a*.

The operation of the portion of the input 310*a* of the transducer arrangement 300 for generating at least one spin wave is the following: a change in physical dimensions of the deformation element 430*a* in response to an electrical actuation via the electrode 420*a* results in a mechanical stress in the magnetostrictive element 440*a*. In turn, this results in a change in magnetization of the magnetostrictive element 440*a* and results in a generation of a spin wave 350 in the waveguide element 200 coupled to the input 310*a*.

It will be appreciated that a detection of a spin wave 350 by an output of the transducer arrangement 300 may be performed in the reversed manner: a propagating spin wave 350 in the waveguide element 200 results in a change of magnetization of the magnetostrictive element 440*a*. This in turn results in a mechanical stress in the magnetostrictive element 440*a* and results in a change in physical dimensions of the deformation element 430*a*, resulting in an electrical actuation in the output.

It should be noted that the transducer arrangement 300 in FIG. 2 may alternatively comprise any other device, unit and/or arrangement for input, training, and/or output purposes. For example, an arrangement comprising one or more antennas (not shown) may be provided. In such an antenna arrangement, a spin wave 350 may be excited by one or more antennas employing Oersted fields, generated by a (microwave) current. For example, one or more antennas may be used for the input/output, whereas (at least portions) of a transducer arrangement 300 as described may be used for training purposes.

Figure 3:
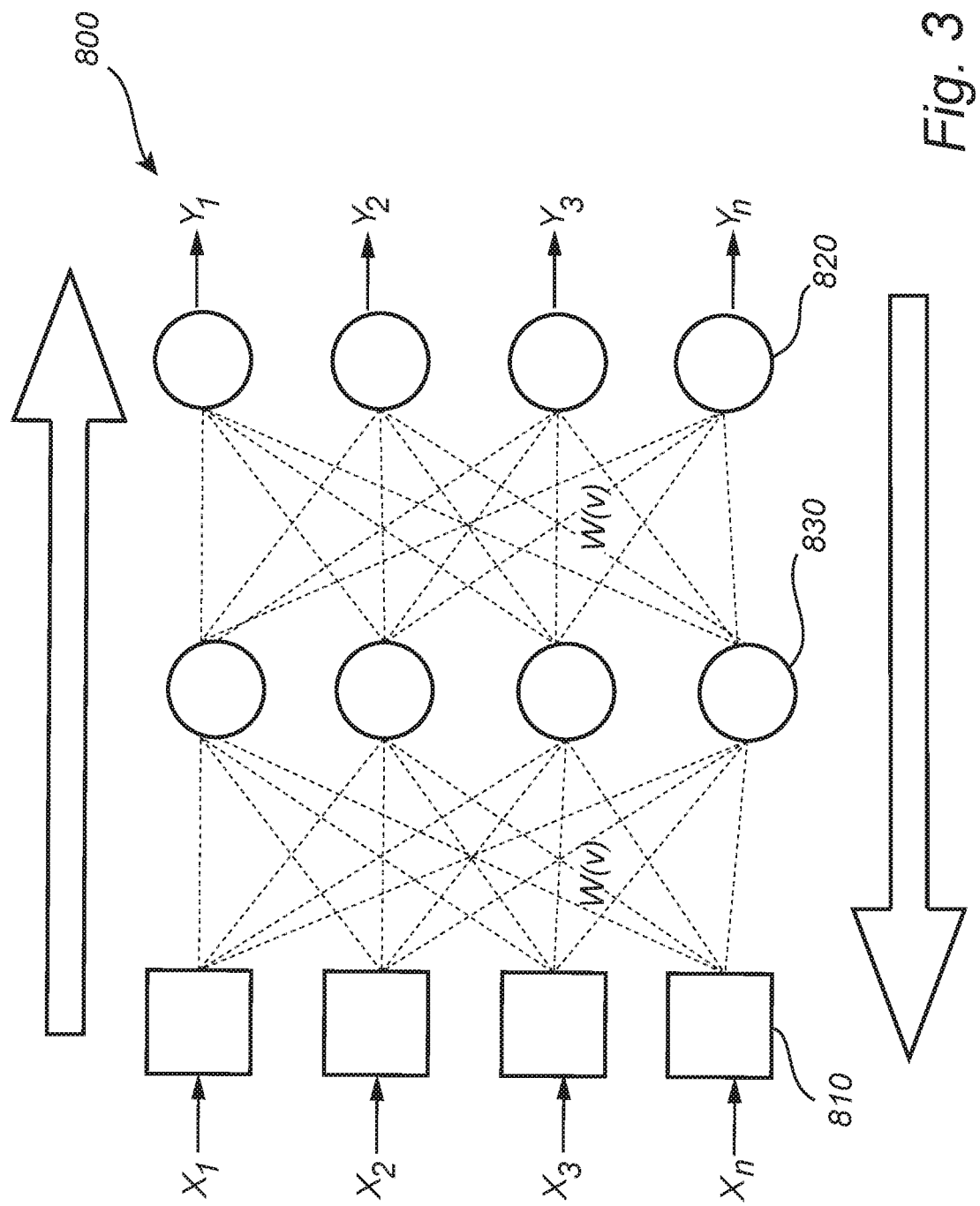
FIG. 3 is a schematic view of a matrix-vector-multiplier, MVM, arrangement according to an exemplifying embodiment of the disclosed technology.

FIG. 3 is a schematic view of a matrix-vector-multiplier, MVM, arrangement 800 according to an exemplifying embodiment of the disclosed technology. The MVM arrangement 800 comprises the arrangement according to any one of the embodiments described previously. The MVM arrangement 800 further comprises an input layer 810 which is configured to input at least one input signal $x_1$, $x_2$, $x_i$ . . . $x_n$ into the MVM arrangement 800, and at least one output layer 820 configured to output at least one output signal $y_1$, $y_2$, $y_i$ . . . $y_n$ from the MVM arrangement 800. The MVM arrangement 800 further comprises at least one intermediate layer 830 arranged between the at least one input layer 810 and the at least one output layer 820. The at least one intermediate layer 830 is coupled to the at least one input layer and the at least one output layer via at least one connection associated with a weight W(v) as a function of the phase velocity of at least one spin wave propagating in the waveguide element of the arrangement. The control mechanism of the arrangement, via the at least one element, is configured to control the respective weight W(v) of the at least one connection by modifying the phase velocity of the at least one spin wave propagating in the waveguide element. In other words, the control mechanism may control the weights W(v) of the MVM arrangement 800 by controlling the phase velocity (velocities) of the spin wave(s) of the arrangement for training the MVM arrangement 800. Hence, the MVM arrangement 800 comprises one or more input layers 810, a trainable medium (the "hidden layer") in form of the one or more intermediate layers 830, and the one or more output layers 820. It should be noted that there may be a plurality of intermediate (hidden) layers 830 of so called deep neural network type. Nodes (artificial neurons) of the input layer(s) 810, intermediate layer(s) 830, and output layer(s) 820 are connected by the weighted connections, corresponding to artificial synapses. During computation, nodes in the intermediate layer(s) 830 respond(s) to the signal(s) at the input layer(s) 810 that are connected to them. Subsequently, the output layer(s) 820 respond in a similar fashion to the connected intermediate layer(s) 830. The MVM arrangement 800 can be taught by adjusting response functions of intermediate 830 and output 820 layers to minimise the output error based on known input signals $x_1$, $x_2$, $x_i$ . . . $x_n$. The direction of the input signals is indicated by arrow 840, and the direction of the error signals 850.

Figure 4:
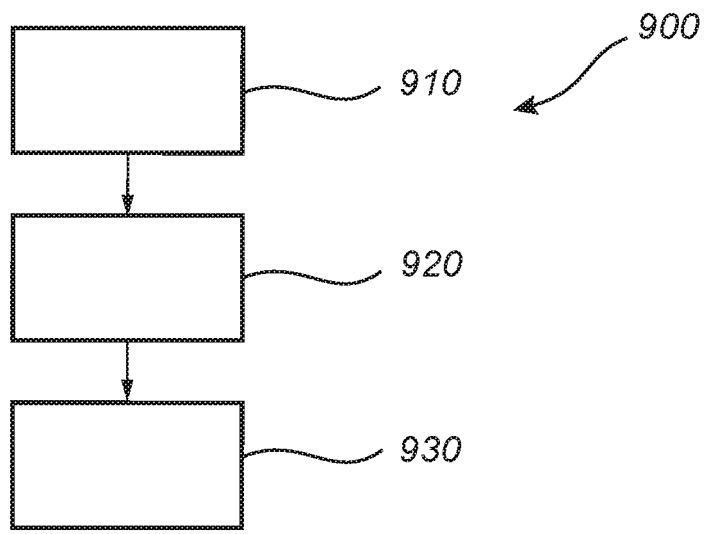
FIG. 4 is a schematic flow chart of a method for training a matrix-vector-multiplier, MVM, arrangement, according to an exemplifying embodiment of the disclosed technology.

FIG. 4 is a schematic flow chart of a method 900 for training a matrix-vector-multiplier, MVM, arrangement, according to a previously described embodiment. The method 900 comprises providing 910 the MVM arrangement according to a previously described embodiment, and via the transducer arrangement of the MVM arrangement, generating and providing interference 920 of at least one spin wave in the waveguide element. Furthermore, the method 900 comprises applying 930, via the direct current electric source and the at least one control element of the control mechanism, a direct current, DC, signal for controlling the respective weight of the at least one connection by modifying the phase velocity of the at least one spin wave propagating in the waveguide element. The method 900 may, as an example, further comprise applying an electric field over the at least one element of the MVM arrangement of 1-20 MV/m, preferably 5-15 MV/m, and even more preferred 7.5-12.5 MV/m. The method 900 may, as an example, further comprise applying the direct current, DC, signal during 0.75-1.25 ms.

Figure 5:
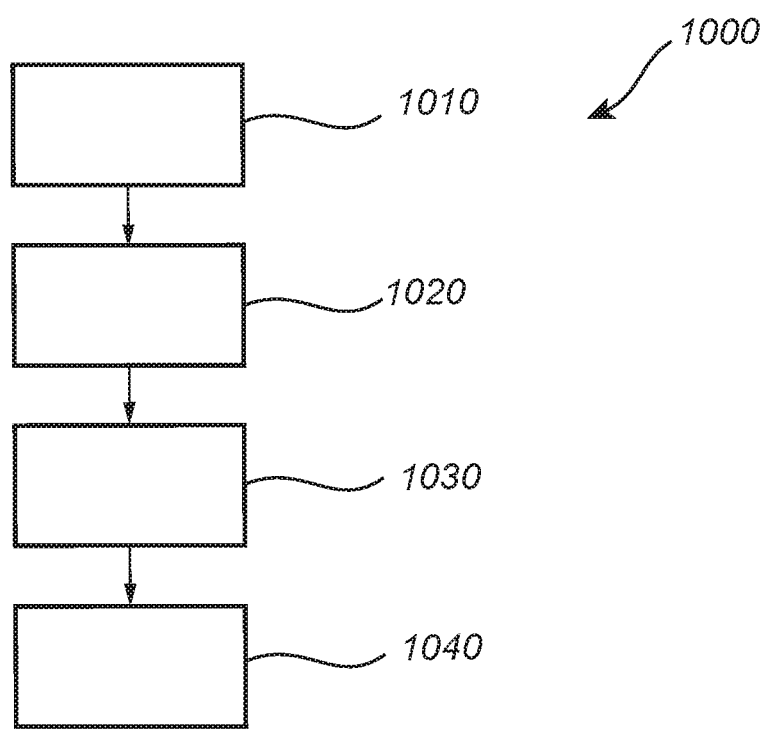
FIG. 5 is a schematic flow chart of a method for using a matrix-vector-multiplier, MVM, arrangement, according to an exemplifying embodiment of the disclosed technology.

FIG. 5 is a schematic flow chart of a method 1000 for using a matrix-vector-multiplier, MVM, arrangement, according to a previously described embodiment. The method 1000 comprises providing 1010 the MVM arrangement according to a previously described embodiment, and performing 1020 the method for training the MVM arrangement according to a previously described embodiment. The method 1000 further comprises providing 1030 at least one input signal into the MVM arrangement via the at least one input layer, and receiving 1040 at least one output signal from MVM arrangement via the at least one output layer.

The person skilled in the art realizes that the disclosed technology by no means is limited to the preferred embodiments described above. On the contrary, many modifications and variations are possible within the scope of the appended claims. For example, it will be appreciated that the figures are merely schematic views of devices according to embodiments of the disclosed technology. Hence, the arrangement, the elements and/or components of the arrangement, etc., may have different dimensions, shapes and/or sizes than those depicted and/or described. For example, one or more layers may be thicker or thinner than what is exemplified in the figures, the stack(s) may have other shapes, depths, etc., than that/those depicted. Moreover, the order of the layer(s) in the stack of material layers may be different than that shown. Furthermore, it will be appreciated that the techniques related to the various configurations and/or operations of the arrangement may be different from those disclosed.

What is claimed is:

1. An apparatus for use in a matrix-vector-multiplier, MVM, wherein the apparatus comprises:
   a stack of material layers arranged on a substrate;
   a waveguide element formed in at least one material layer in the stack;
   a transducer coupled to the waveguide element and configured to generate and detect at least one spin wave in the waveguide element, wherein the waveguide element is configured to confine and to provide interference of the at least one spin wave propagating therein;
   a control mechanism formed in at least one material layer in the stack, wherein the control mechanism comprises:
      at least one control element coupled to the waveguide element, and
      a direct current electric source coupled to the at least one control element,
   wherein the control mechanism, via the at least one control element, is configured to modify a phase velocity of the at least one spin wave propagating in the waveguide element.

2. The apparatus of claim 1, wherein the waveguide element comprises a magnetic material.

3. The apparatus of claim 1, wherein the waveguide element comprises a ferrimagnetic yttrium iron garnet, YIG.

4. The apparatus of claim 1, wherein the at least one control element comprises at least one antenna.

5. The apparatus of claim 1, wherein the at least one control element comprises at least one magnetoelectric cell.

6. The apparatus of claim 5, wherein the at least one magnetoelectric cell comprises at least one piezoelectric element.

7. The apparatus of claim 1, wherein the transducer comprises at least one input for generating at least one spin wave in the waveguide element and at least one output for detecting at least one spin wave propagating in the waveguide element.

8. The apparatus of claim 7, wherein the at least one input comprises:
   an input electrode;
   a deformation element coupled to the electrode; and
   a magnetostrictive element coupled to the deformation element,
   wherein a change in physical dimensions of the deformation element in response to an electrical actuation via the input electrode results in a mechanical stress in the magnetostrictive element, which results in a change in magnetization of the magnetostrictive element and in a generation of a spin wave in the waveguide element.

9. The apparatus of claim 7, wherein the at least one output comprises:
   an output electrode;
   a deformation element coupled to the electrode; and
   a magnetostrictive element coupled to the deformation element,
   wherein the at least one propagating spin wave results in the change of magnetization of the magnetostrictive element, which results in a mechanical stress in the magnetostrictive element and results in a change in physical dimensions of the deformation element and in an electrical actuation in the output electrode.

10. A matrix-vector-multiplier, MVM, apparatus, comprising:
    the apparatus for use in the MVM of claim 1;
    at least one input layer configured to input at least one input signal into the MVM arrangement;
    at least one output layer configured to output at least one output signal from the MVM arrangement;
    at least one intermediate layer arranged between the at least one input layer and the at least one output layer, wherein the at least one intermediate layer is coupled to the at least one input layer and the at least one output layer via at least one connection associated with a weight as a function of a phase velocity of at least one spin wave, $W(v)$, propagating in the waveguide element of the arrangement,
    wherein the at least one intermediate layer is further coupled to the at least one control element,
    and wherein the control mechanism, via the at least one control element, is configured to control the respective weight of the at least one connection by modifying the phase velocity of the at least one spin wave propagating in the waveguide element.

11. A method for training a matrix-vector-multiplier, MVM, arrangement, comprising:
    providing the MVM arrangement of claim 10;
    via the transducer of the MVM arrangement, generating and providing interference of at least one spin wave in the waveguide element,
    applying, via the direct current electric source and the at least one control element of the control mechanism, a direct current, DC, signal for controlling the respective weight of the at least one connection by modifying the phase velocity of the at least one spin wave propagating in the waveguide element.

12. The method of claim 11, further comprising applying an electric field over the at least one element of 1-20 MV/m, preferably 5-15 MV/m, and even more preferred 7.5-12.5 MV/m.

13. The method of claim 11, further comprising applying the direct current, DC, signal during 0.75-1.25 ms.

14. A method for using a matrix-vector-multiplier, MVM, arrangement, comprising:
    providing an MVM arrangement comprising:
       a stack of material layers arranged on a substrate;
       a waveguide element formed in at least one material layer in the stack;
       a transducer coupled to the waveguide element and configured to generate and detect at least one spin wave in the waveguide element, wherein the waveguide element is configured to confine and to provide interference of the at least one spin wave propagating therein;
       a control mechanism formed in at least one material layer in the stack, wherein the control mechanism comprises:
          at least one control element coupled to the waveguide element, and
          a direct current electric source coupled to the at least one control element,
       wherein the control mechanism, via the at least one control element, is configured to modify a phase velocity of the at least one spin wave propagating in the waveguide element;
    performing the method for training the MVM arrangement of claim 11;
    providing at least one input signal into the MVM arrangement via the at least one input layer; and
    receiving at least one output signal from the MVM arrangement via the at least one output layer.

15. An artificial neural network, comprising the MVM apparatus of claim 10.

\* \* \* \* \*